United States Patent [19]

Nilsen

[11] 3,917,775
[45] Nov. 4, 1975

[54] METHOD FOR THE PRODUCTION OF WALL PANELS

[76] Inventor: Walter Nilsen, Prins Oscarsgt, 32, N-3000 Drammen, Norway

[22] Filed: Feb. 14, 1974

[21] Appl. No.: 442,520

[30] Foreign Application Priority Data
Feb. 15, 1973    Norway.................................. 623/73

[52] U.S. Cl. .............. 264/46.2; 264/46.5; 264/113; 264/171; 264/261
[51] Int. Cl.²......................................... B29D 27/04
[58] Field of Search ........... 264/47, 46.2, 46.5, 261, 264/280, 113, 171; 52/415, 419, 425

[56] References Cited
UNITED STATES PATENTS

| | | | |
|---|---|---|---|
| 3,159,514 | 12/1964 | McKnight, Jr. et al............... | 264/47 |
| 3,738,895 | 6/1973 | Paymal ................................. | 264/47 |
| 3,792,141 | 2/1974 | Offutt ................................... | 264/47 |

Primary Examiner—Jan H. Silbaugh
Assistant Examiner—T. E. Balhoff
Attorney, Agent, or Firm—Nolte and Nolte

[57] ABSTRACT

A method and apparatus for the production of panels which consists in forming a pair of continuous webs of plasterboard, drying those webs and introducing between them a foamable material and a blowing agent to produce a continuous composite structure having plasterboard facing sheets and a core of foamed material.

5 Claims, 2 Drawing Figures

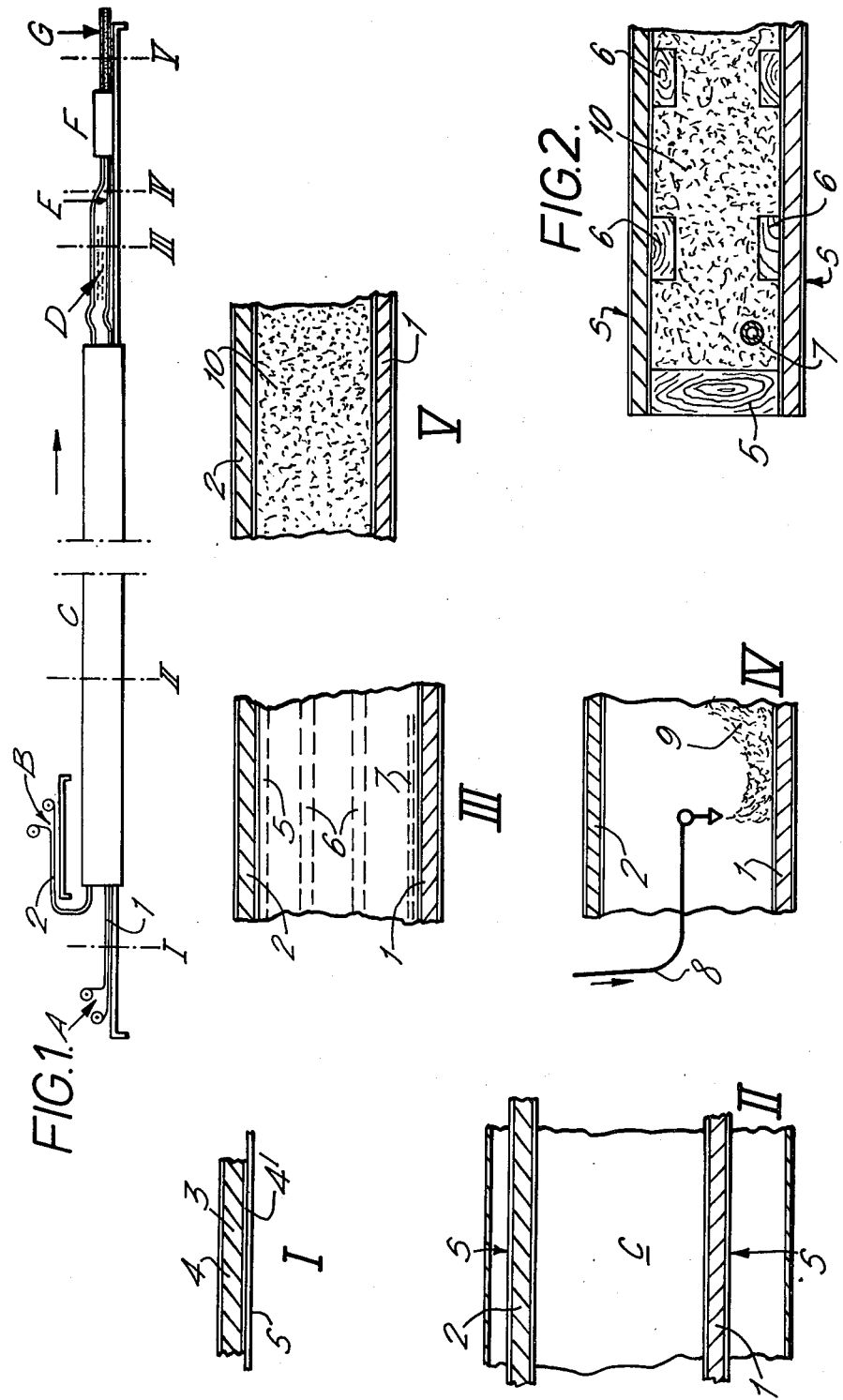

METHOD FOR THE PRODUCTION OF WALL PANELS

The invention concerns a method and a plant for production of wall panels of the kind that comprises two gypsum plates forming the outer cladding and with a layer of foam plastic material or the like therebetween.

It is previously known to produce gypsum plates by cutting webs of gypsum material, preferably arranged between covering layers of paper board or the like, after curing to selfsupporting condition into suitable plate lengths. These blanks are dried and hardened to form finished gypsum plates for use for house construction or the like. It is furthermore known to produce building elements comprising layers of foam plastic or the like. Such foam plastic plates covered on both sides with gypsum plates also are previously known. In the production of such plates one has assembled suitable lengths of plates. In other words, in the previous production of such products one has had to cast or laminate all panels having finite dimensions, as it has been necessary to fix the measurements before the production. Therefore, the use of such wall panels has been restricted to module or prefabricated houses. In addition to this restriction, which often is very unfavourable, the production costs will be so high that the possible use of the elements becomes greatly restricted.

It is the object of the invention to provide a method and a plant by which one can produce wall panels of the previously mentioned kind as an endless web by a continuous and linear process, whereby production costs are greatly reduced. The web is produced with a width corresponding to the standard wall height in houses. The length can optionally be cut in accordance with the length of the particular walls, and thereby one can produce single wall panels with dimensions corresponding to entire walls or roofs, something that intuitively evidently is a major advantage. Thereby one gains a completely flexible system for building houses with arbitrary dimensions of both walls and roof. Thereby the use of these plates is not restricted to module of prefabricated houses.

For the attainment of this, it is suggested in accordance with the invention that the production occurs lineary and continuously in a way known per se in that two webs of gypsum plate blanks are produced, said webs continuing directly into a drying chamber, through which the webs are led in a certain mutual spacing over a distance and time interval giving hardening and drying of the gypsum; introducing between the webs a filling material in liquid form like for instance plastic material with a blowing agent added; guiding the two webs to a calibration device and cutting the resulting unitly web of foam plastic covered on both sides with gypsum plate webs into suitable and desirable lengths. If desirable, before the filling material is added, edge ledges, pegwood, piping etc. can be introduced between the webs.

According to a preferred embodiment, the method is used in that the production of the two webs of gypsum plate blanks is done by one of them being produced in a usual plant and the other being produced in a usual plant arranged above the first mentioned web, said other web turned 180° before it is joined with the first web and continues parallel together with the first web into said drying chamber.

Wall panel webs in accordance with the invention are preferably produced as previously mentioned in a width corresponding to the standard roof height for a building, but the invention is of course not restricted to this even though such dimensions will be the usual.

For bettering the understanding of the invention, it will be described in the following by way of exampel with reference to the accompanying drawings showing schematicly an example of an embodiment.

FIG. 1 shows a diagram of a production line for plates produced in accordance with the invention. The figure shows five broken lines indicating sections that are shown in larger scale under I–V.

FIG. 2 shows a cross section through a part of the finished plate.

The production line in accordance with FIG. 1 comprises two plants A and B, each of which in a way known per se producing webs of gypsum plate blanks, the gypsum mass 3 being introduced between to webs 4, 4' of paper board or the like. These webs are guided in accordance with the invention directly into a long drying chamber C after the gypsum in the plates has become sufficiently selfsupporting for the upper web 2 to be turned around 180° as indicated on the drawing and guided into the chamber parallel to and in a certain distance from the web 1.

This turning of the upper web 2 can take plate also in other ways, but the main thing is that the upper web is turned in relation to the lower web, the two parallel webs continuing through the production line thereby having sides facing out that have been in contact with the production belt during the forming, that is even and smooth sides.

After having passed the drying chamber C, where time and distance are controlled for hardening and drying of the gypsum, the webs continue through an equalizing device for compensating for possible speed variations. This device is in the drawing only suggested by the webs 1 and 2 having a wavy path.

The webs 1, 2 continue past a station D where suitable elements can be introduced between the webs, for instance such elements as in the finished plates will constitute edge ledges 5, pegwood 6 or piping 7 as suggested in section III.

During the further transport the webs pass on to a station E where filling material, like for instance plastic material 9 with blowing agent added, is introduced between the webs from a line 8. This material will blow and form foam plastic which completely fills the room between the two webs 1 and 2. During this process the webs pass a calibration device F where the thickness of the finished joined web is decided. When the foam plastic material has hardened, one has obtained a finished web as shown in FIG. 2 consisting of an inner filling of foam plastic 10 and an outer cladding on both sides of the gypsum material. This finished web can, if desirable, contain edge ledges 5, pegwood 6 and piping 7 as desired. The finished web is finally cut by suitable means G into suitable and desired lengths. These wall panels will be completely smooth and even on both sides since the sides s as previously mentioned both have been formed by contact with the production belt.

As mentioned, it is previously known to produce plates of the kind constructionwise corresponding to plates produced in accordance with the invention, but these previously known plates have had to be produced in module widths for instance from 60–130 centimeters and have been cut in standard lengths. Thereby one has got building elements having fixed dimensions. In accordance with the invention it will be possible to produce entire walls, roofs or the like as single building elements. Walls and roofs of buildings can thereby be produced without any joints. Together with a highly rationalized, simplified and cheap method of production of the plate material, the advantages of building module houses are retained.

I claim:

1. A method of producing panels which comprises forming a first continuous web of a composite structure by introducing a gypsum material between two opposed travelling paper webs; simultaneously forming a second continuous web of such a composite structure by the introduction of gypsum material between a further two opposed travelling webs; transporting said continuous structures without interruption and in opposed relationship from a region at which said webs are formed to a drying chamber and drying said structures to an extent to cause them to become substantially rigid; thereafter introducing a foamable plastic material and a blowing agent into a space defined by opposed faces of said substantially rigid structures during transportation of said structures; continuing transportation of said structures to a callibrating device and in so doing reducing the space between said opposed faces of the structures to a predetermined size to be filled by expansion of said plastic material and related to the required thickness of a panel; maintaining the structures in substantially parallel relationship, curing the resultant composite web of plaster-boards and foamed plastic material and cutting said composite web into panels of selected length.

2. The method as claimed in claim 1 wherein before said webs of composite structures are dried, one of said webs is turned through 180°.

3. The method as claimed in claim 1 wherein said webs of a composite structure are formed one above the other, one said web initially travelling in a direction opposite to that in which the other said web travels and thereafter being turned through 180° to travel in the same direction as the other said web, prior to being dried.

4. A method as claimed in claim 1 wherein structural elements are introduced into the space between the webs prior to the introduction of said plastic material.

5. A method as claimed in claim 4 wherein structural elements are introduced into the space between the webs prior to the introduction of said plastic material.

* * * * *